Figure 1:
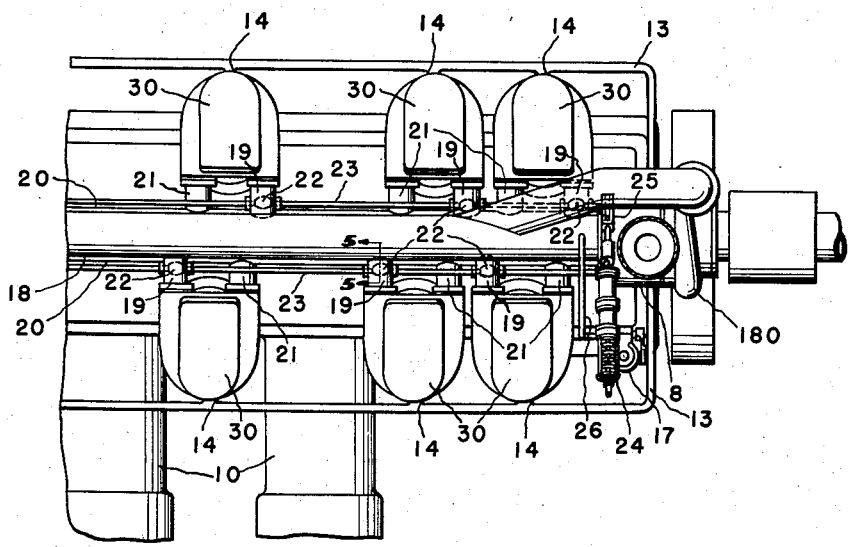

Nov. 25, 1958     P. A. BANCEL     2,861,556
INTERNAL-COMBUSTION ENGINE
Filed May 9, 1952     3 Sheets-Sheet 1

INVENTOR
PAUL A. BANCEL
BY
HIS ATTORNEY

Nov. 25, 1958   P. A. BANCEL   2,861,556
INTERNAL-COMBUSTION ENGINE
Filed May 9, 1952   3 Sheets-Sheet 2
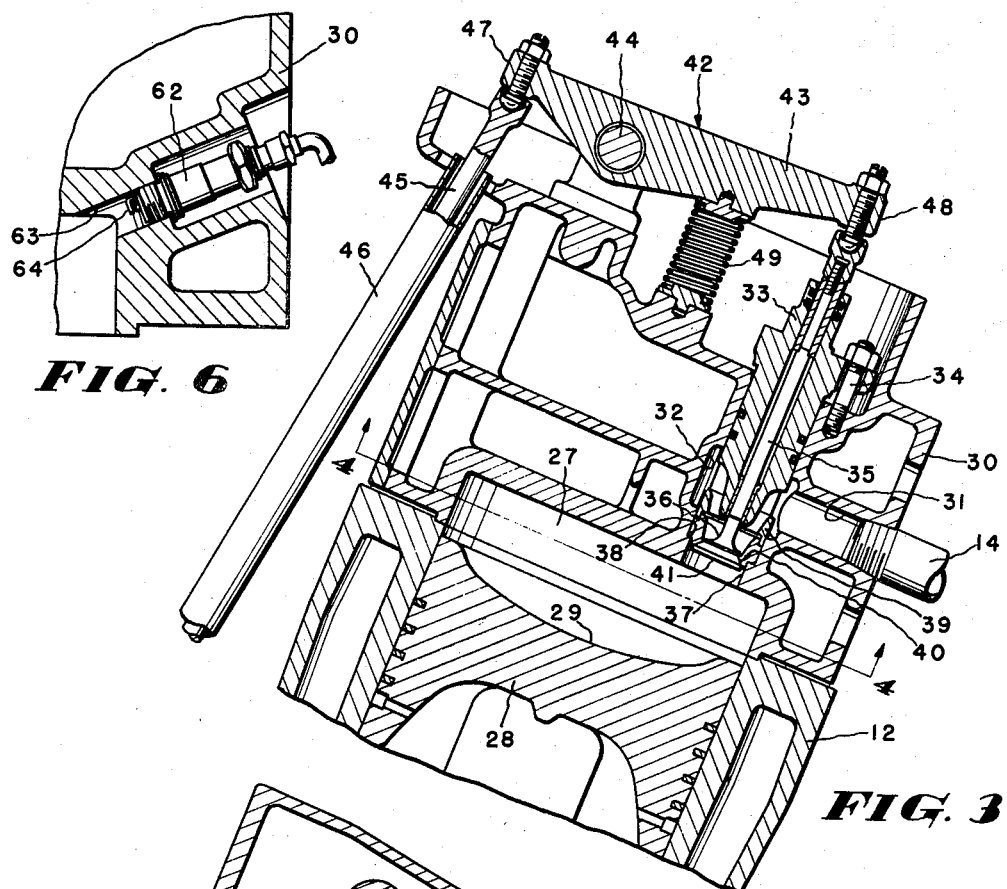
FIG. 6
FIG. 3
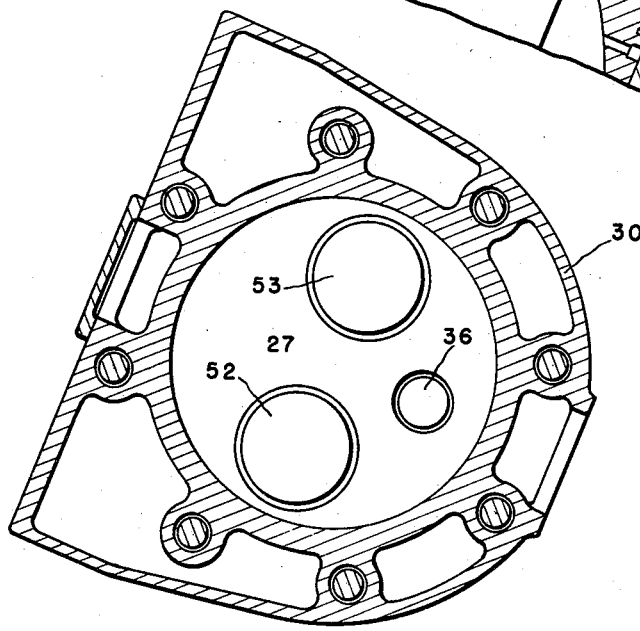
FIG. 4
INVENTOR
PAUL A. BANCEL
BY
HIS ATTORNEY

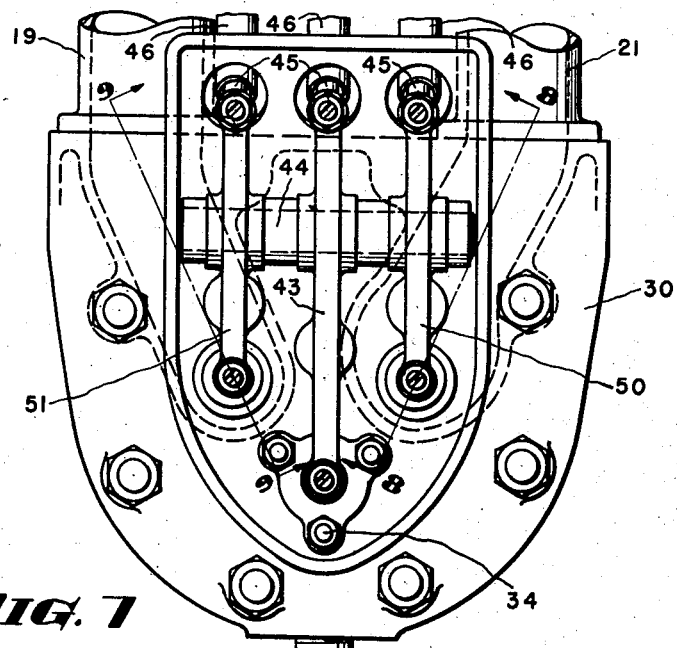
FIG. 7
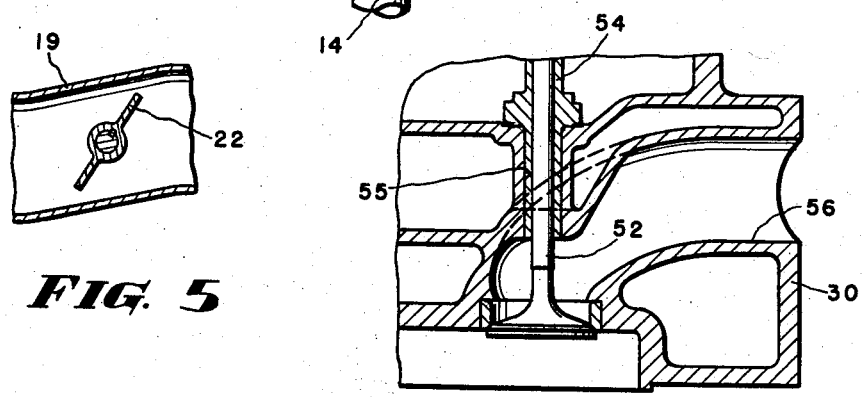
FIG. 5
FIG. 8
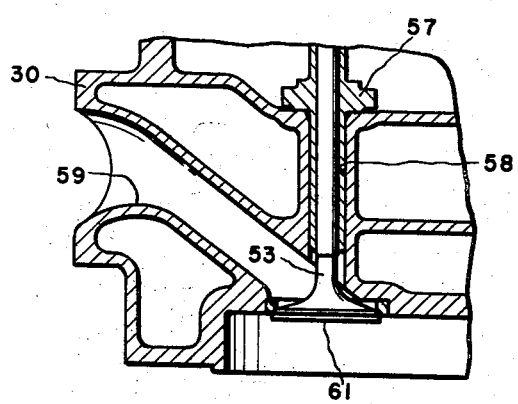
FIG. 9
INVENTOR
PAUL A. BANCEL
BY
HIS ATTORNEY ced Nov. 25, 1958

2,861,556

INTERNAL-COMBUSTION ENGINE

Paul A. Bancel, Montclair, N. J., assignor to Ingersoll-Rand Company, New York, N. Y., a corporation of New Jersey Application May 9, 1952, Serial No. 287,005

6 Claims. (Cl. 123—59)

This invention relates to internal combustion engines and, more particularly, to spark ignition, supercharged four stroke cycle internal combustion engines burning gaseous fuel and having valve overlap.

In the field of internal combustion engines with spark ignition and moderate compression ratios (between 5:1 to 8:1), efforts have long been directed toward increasing the efficiency and capacity of the engine and to increase the range of capacity without increasing the compression ratio. Success has been limited. Among the various factors determining the capacity of an engine of this type, one of the more important is its air capacity—i. e., the weight of air content in the engine cylinder at the time of closing the inlet valve.

With a naturally aspirated engine (atmospheric air is drawn into the cylinder on the suction stroke of the piston) having conventional valve timing, the maximum volumetric capacity is 100% of the piston displacement (piston area times the length of the stroke). The practical air capacity is, however, somewhat less than 100% due to the loss of pressure in the air passing through the inlet valve, a small loss of displacement due to the closing of the inlet valve after the piston has started on the compression stroke and a loss due to the heating of intake air by hot valves, cylinder head and piston. This limitation of air capacity applies regardless of the clearance space so long as the engine is naturally aspirated. This follows from the fact that the expansion of the clearance gases on the beginning of the suction stroke is practically negligible, hence, it makes no difference so far as the capacity of the engine is concerned whether the clearance space is relatively large or small.

Moreover, it is well known that low or moderate compression engines of the spark ignition type cannot be operated successfully with a mixture of fuel and air of less than 80% to 85% of stoichiometric. Usually, this mode of operation calls for earlier timing of the spark ignition due to slow burning of the lean mixture and practically is used within rather narrow limits of excess air quantity.

In the present invention, the capacity of the engine is increased by pressurizing the inlet air and using valve overlap; the efficiency of the engine is increased by burning a fuel-air mixture having 50% excess air. Such burning is obtained by creating a high velocity toroidal flow of air within the cylinder, directing a high velocity jet of fuel into such toroid to obtain effective fuel air mixing, and by insuring ignition of the mixture by protecting the ignitor from the high velocity flow of the mixture. For the purpose of clarity the factors of pressurizing with valve overlap, mixing of fuel and air, fuel injection and ignition and their effects on engine operation will be separately discussed, but it is to be understood that these factors all cooperate to obtain the objects of this invention.

*Pressurizing and valve overlap*

The principles which limit the capacity of a naturally aspirated engine do not apply to an engine which is arranged to scavenge with valve overlap. In the present engine the inlet valve opens 50° to 80° before the piston reaches top dead center on the exhaust stroke and the exhaust valve closes 50° to 70° after top dead center on the suction stroke so that both the inlet and exhaust valves are open simultaneously for a relatively long period near the end of the exhaust stroke. Air under pressure of from 3 to 5 pounds per square inch (p. s. i.) is admitted into the combustion chamber during this period, and 20% to 40% of this air blows directly from the inlet into the combustion chamber and out the exhaust. This scavenges practically all of the hot gases and also cools the inlet and exhaust valves and the piston.

With an engine having 20% clearance, the basic volumetric capacity is then 120% as compared to the 100% figure noted in connection with the naturally aspirated engine. From this figure (120%) there must be subtracted the first two losses mentioned in connection with a naturally aspirated engine—namely, the loss of pressure of air passing through the inlet valve and the loss of capacity due to the movement of the piston on its exhaust stroke. However, the third loss due to the heating of the inlet air by the hot piston and valves is greatly reduced.

The process of scavenging may be accomplished by maintaining a vacuum of from 3 to 5 p. s. i. in the exhaust system by a suitable vacuum pump, or under some conditions by exhaust piping tuned to give favorable harmonic pressure oscillations in the exhaust manifold. In the form of the invention illustrated this process is obtained by pressurizing the air inlet manifold, the air being compressed by a turbocharger. Any suitable form of compressor may be used, but in the present instance it was found preferable to use a centrifugal type compressor driven by a gas turbine which in turn is powered by the exhaust of the engine.

Such pressurizing greatly increases the air content of the cylinder which may readily be 160% of the naturally aspirated engine, and accordingly increases the fuel burning capacity in the same proportion. Ordinarily, however, engines are not operated at their maximum capacity except for short periods and in special applications. Practical considerations of pressures and temperatures limit the normal operating range to a safe margin below maximum capacity. This is all the more true with a turbocharged engine because the result of increasing load is to exhaust more energy to the turbine and thus increase the amount of air supplied thereby to the engine.

*Toroidal flow*

With the engine described the turbocharger size, design and piping are selected to supply approximately twice the quantity of air required for a stoichiometric mixture of fuel and air when the air inlets are fully open and the fuel burned corresponds to the desired rated load. At intermediate and low loads the air supplied to the engine is throttled at the cylinder inlets so that part only of the available air is used, but at higher loads the inlet is fully open so that the entire discharge of the turbocharger enters the combustion chamber. Part of this air is blown through the engine in the scavenging process but the quantity of air remaining in the cylinder is about 50% above the stoichiometric requirements.

While in a naturally aspirated engine such air excess could not be used to advantage, it was found that by creating toroidal flow within the combustion chamber so as to obtain an increased rate of flame travel or propagation, a lean mixture could be burned throughout the normal operating range of 50% to 110% load and this without varying the point of spark advance from that used with richer mixtures. Such effective burning of a lean mixture resulted in reduced specific fuel consumption of the engine and at the same time reduced the temperatures and stresses on the engine parts.

The toroidal movement of the fluid contents of the cylinder is here obtained by directing the flow of air such that it has both longitudinal and transverse velocity components relative to the longitudinal axis of the cylinder—this is discussed in greater detail hereinafter in connection with Figure 9. While it is common practice to develop toroidal flow in the cylinder of a naturally aspirated engine, after the exhaust valve closes, there is no prerotation as in the present invention. In the present invention the entire contents of the clearance space is not only scavenged, but the clean air remaining in the clearance space is set into motion before the exhaust valve closes. The velocity of the cylinder content at that time being dependent on the pressure on the inlet air, the velocity of air admitted after the exhaust valve closes is determined primarily by the speed of the piston moving on its suction stroke which creates a pressure differential between the piston chamber and the air manifold. Accordingly, the entire 120% content of the cylinder is set into motion along a flow path of toroidal form, and it is known by experiment that this motion persists throughout the compression stroke of the piston and exists at the time of ignition and combustion at the end of this stroke. It is also to be noted that such motion of the air and fuel results in thorough mixing thereof so as to insure even burning of the lean mixtures mentioned.

Fuel injection

It was found by experiment that the toroidal movement had an adverse effect on the distribution or mixing of gas and air if the conventional method of fuel injection was used. Moreover, injecting fuel in the usual manner resulted in a loss of capacity. In previous engines, particularly gasoline engines, it was common to inject the fuel during the suction stroke of the piston—i. e., as the piston is moving away from the cylinder head. While a similar method of timing of fuel injection may be followed with gaseous fuel, it results in a reduction of air content in the cylinder in that the injected gas displaces 5% to 10% or more of the cylinder air content. It was, therefore, found to be desirable to delay the time of gas injection until after the piston was at the bottom of its stroke and the cylinder was, accordingly, full of air.

With this timing of fuel injection, it was found however that the toroidal movement of air mass in the cylinder opposed the effective dispersion of the gas throughout the piston chamber, particularly at the normal, full load and overload of the engine at which time the air inlet is fully open. Indeed, when the gaseous fuel was injected in the conventional manner but at the later point in the cycle, the engine would not operate successfully at normal and overloads—the consumption of fuel was excessive, exhaust temperatures were extremely high and missing occurred with the accompanying after-burning in the exhaust system. This difficulty was overcome by injecting the fuel into the combustion chamber in the form of a jet having sufficient velocity to penetrate the entire cylinder contents and strike the piston head, from whence it is deflected into the central core of the cylinder where a powerful toroidal current of rising air mixes with the gas and carries it toward the head of the cylinder and the point of ignition.

Ignition

With conventional spark ignition it was found that at the higher engine load levels and at which time there is little or no throttling of the inlet and high velocity toroidal movement of the fuel-air mixture, severe missing of the engine occurred. At these load levels the fuel-air mixture is swept by the ignition point at such a high velocity that it is almost impossible to heat any portion of the fuel-air mixture to the ignition point.

To overcome this difficulty spark plugs were constructed with semicircular and cylindrical shields of ½ inch to ¾ inch long to protect the ignition points from the direct blast of the fuel-air mixture. With such plugs engines of several different sizes were operated successfully over their entire load ranges. The same results may be accomplished by recessing the spark plug approximately ½ inch into the cylinder wall, so as to create a relatively small quiescent volume of fuel-air mixture which may be readily ignited. It is in this form that the means for protecting the ignition points from the direct blast of the toroidal movement of the fuel-air mixture is illustrated in the drawings. The importance of this feature of the invention is illustrated by experiments conducted with a 12 cylinder engine in which 3 cylinders only were fitted with spark points exposed to the direct blast of the toroidal flow in the piston chamber. At normal and overloads, the 3 cylinders missed badly and the engine speed fluctuated resulting in hunting of the governor and further speed fluctuations which were so severe that the entire engine was for all practical purposes inoperative.

In view of the foregoing it is clear that the capacity of a low compression type engine can be very greatly increased by scavenging and turbocharging with moderate pressurizing, and that this large air quantity available to support combustion can be used to advantage by creating a high velocity toroidal movement of the fuel and air mixture in the cylinder when combined with high velocity jet fuel injection and protected ignition points. It is accordingly one object of this invention to construct a moderate compression spark ignition internal-combustion engine having supercharging with valve overlap and in such a manner as to obtain increased capacity and relatively high efficiency over a wide operating range as compared with the conventional engine of this compression range.

A more particular object is to insure rapid burning of fuel and air by creating a high velocity toroidal flow of the fluid contents of the engine cylinder.

A further object of this invention is to insure smooth running of the engine over the entire load range of the engine by protecting the ignition points from the direct blast of such toroidal flow.

Figure 2:
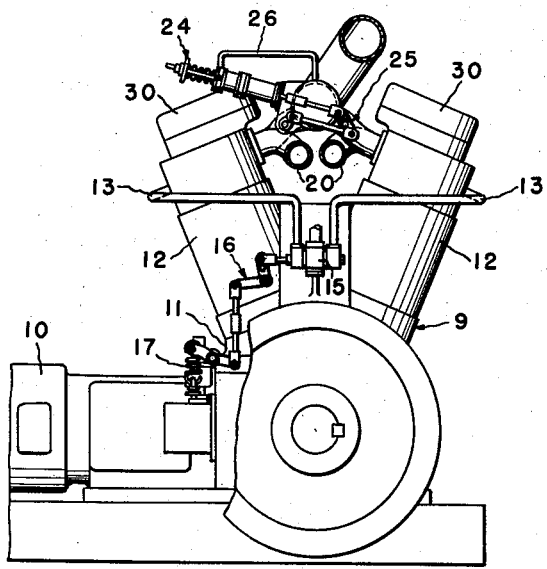

Other objects of the invention will become obvious from the following description, and drawing, in which, Figure 1 is a top view of an engine constructed in accordance with the practice of the invention, Fig. 2 is an end view of the engine, Fig. 3 is a sectional elevation of a cylinder of the engine, Fig. 4 is a transverse view taken through Fig. 3 looking in the direction of the arrows, Fig. 5 is a sectional view of the air inlet valve, Fig. 6 is a fragmentary sectional view of a cylinder showing the location of a spark plug, Fig. 7 is a top view of a cylinder, Fig. 8 is a fragmentary sectional view of a cylinder head showing the location of an exhaust valve, and Fig. 9 is a fragmentary sectional view of the cylinder head showing the air inlet passage and inlet valve.

Referring to the drawings, Figure 1 shows a V-type engine 9 constructed in accordance with the practice of the invention and arranged to drive compressors 10 (shown in part only). The engine includes a housing 11 on which are mounted cylinders 12 aligned along the opposite sides of and inclined with respect to a longitudinal vertical plane through the housing 11 in a manner characteristic of the V-type engine.

Fuel—in this instance a gaseous fuel—is supplied under pressure to the cylinders 12 by means of a pair of fuel manifolds 13 running along the opposite sides of the engine adjacent the cylinders 12 and having short branch pipes 14 leading into the cylinders 12. The flow of fuel to the cylinders is controlled by means of a gas valve 15 which, in turn, is actuated through linkages 16 by a speed governor 17 driven by the engine 9. The governor 17 may be of any conventional type which is adapted to increase the fuel supply in response to a load increase on the engine, and to decrease the fuel supply whenever such load decreases.

Air is supplied to the cylinders 12 by a blower 180 driven by a gas turbine 8 powered by the exhaust of the engine 9. Air is conducted from the blower 180 to the cylinders 12 through a supply, or intake, manifold 18 having short branch pipes 19 leading to the cylinders 12. A similarly constructed manifold 20 located along and within the V formed by the cylinders 12, as is the intake manifold 18, is provided with branch pipes 21 connected to the cylinders 12 for the escape of exhaust from the cylinders.

The flow of air into the cylinders 12 is controlled by butterfly valves 22 located in each of the intake branch pipes 19 and operated in unison by means of rods 23 connected thereto. The rods 23 are connected through linkage 25 to a regulator 24 which is communicated with the intake manifold 18 by a pipe 26. The regulator 24 may be of any conventional type adapted to act in response to slight variations in intake air pressure to actuate the linkage 25 and thereby rotate the rods 23 to open or close the butterfly valves 22. In the embodiment of the invention illustrated, whenever the load on the engine is increased such that the speed governor 17 acts to increase the supply of fuel to the cylinders 12, the air pressure in the manifold 18 will increase slightly—due to the higher turbine and blower speed resulting from the increase in fuel supply—thereby actuating the regulator 24 to rotate the rods 23 opening the butterfly valves 22 to increase the supply of air to the cylinders 12. The converse action occurs on a decrease in engine load.

The purpose of locating the valves 22 in the intake pipes 19 adjacent the cylinders 12 is to prevent blowback from the exhaust manifold 20 through the cylinder 12 into the intake manifold 18 during the valve overlap period at low loads. That is, inasmuch as this engine is designed to scavenge, there is a period over which the inlet and exhaust valves are simultaneously open. During normal load operations—at which time there is very little throttling of inlet air—the pressure in the intake manifold 18 exceeds the pressure in the exhaust manifold 20 so that there is no danger of blowback.

However, when the engine is operating at relatively low load levels so that it is necessary to throttle the inlet air, and assuming the inlet air control valve is located upstream of the air manifold 18—as at the discharge of the blower 180—there is a period when a negative pressure, or vacuum, would exist in the air manifold. This is so because some of the pistons are moving on their suction stroke drawing air from the manifold at a faster rate than air can flow through the throttle valve into the manifold. Accordingly, in other cylinders where the pistons are moving on their exhaust stroke and both the inlet and exhaust valves are open, it is clear that blowback into the intake manifold 18 will occur. This difficulty is here avoided by providing inlet valves 22 for each cylinder and being located between the air manifold and the cylinder. This prevents the creation of a vacuum in the air manifold, indeed, the pressure in the manifold is the same as the discharge pressure of the blower 180, thereby effectively precluding any possibility of blowback in the manifold.

Referring now in detail to the other structural elements mentioned hereinbefore which are combined in a functional and structural relationship so as to obtain the objects of the invention, the cylinder 12 (see Fig. 3) is provided with a piston, or combustion, chamber 27 for a reciprocating piston 28 having a concave face 29, which face aids in the formation of toroidal flow of the fuel and air mixture within the chamber 27 (to be explained in greater detail hereinafter). The cylinder 12 includes a cylinder head 30 having transverse and longitudinal passages 31 and 32, respectively, therein arranged to form a fuel inlet passage for the chamber 27. The longitudinal passage opens at one end in the chamber 27, and the transverse passage 31 terminates at one end in passage 32 and the other end is connected to a branch pipe 14 of the gas manifold 13 thereby supplying fuel to the chamber 27 through the longitudinal passage 32.

The flow of gas into the chamber 27 is controlled by a fuel, or gas, valve 36. In furtherance to this end, fitted in the longitudinal passage 32 is a bushing 33, secured to the head 30 by means of bolts 34, which serves as a guide for the stem 35 of the fuel valve 36. The lower, or downstream, end portion 37 of the passage 32 is of somewhat reduced diameter, and bearing against the shoulder 38 formed by such reduction is a bushing 39 providing a valve seat 40 for the head 41 of the fuel valve 36.

It is to be noted that with this arrangement the valve seat 40 is located a short distance upstream of the outlet end of the passage 32, and that the maximum diameter of the head 41 is slightly less than the diameter of the reduced portion 37 of the passage 32. Thus, whenever the valve 36 is unseated a high velocity cylindrical stream, or jet, of fuel is injected into the chamber 27, the thickness of the wall and the velocity of the fuel jet being determined by the difference in the maximum diameter of the head 41 and of the diameter of the passage portion 37. Such a stream is capable of penetrating deep within the chamber 27, thereby permitting fuel to be injected when the piston is near bottom dead center.

The fuel valve 36 is operated by a conventional cam operated valve rocker, designated in its entirety by the numeral 42, comprising a rocker 43 pivoted intermediate its ends on the pivot 44 supported by the cylinder head 30. The rocker 43 is rocked to actuate the valve 36 into its open position by means of a rocker arm 45 encased in a sheath 46 and pivotally connected to the left end 47 (as seen in Fig. 3) of the rocker 43. The rocker arm 45 may be actuated by a cam shaft (not shown) or any other conventional valve actuating means driven by the engine 9. The opposite or right end 48 of the rocker 43 is pivotally connected to the end of the valve stem 35, and a spring 49 biased between the head 30 and the rocker 43 at a point intermediate the pivot 44 and the end 48 of the rocker 43 serves to return, or seat, the valve 36.

Similar cam operated rockers 50 and 51 are provided for actuating, respectively, an exhaust valve 52 and an inlet valve 53. The exhaust valve 52 is slidably mounted in a bushing 54 fitted in a passage 55 formed in the head 30, and serves to control the flow of exhaust from the chamber 27 through an exhaust passage 56 formed in the head 30 and communicating with the exhaust main through a branch pipe 21.

In order to increase the speed and efficiency of burning of the fuel in the combustion chamber 27, means are provided for controlling the admission of air under pressure into the chamber and arranged to create high velocity toroidal flow in the chamber 27. In the form of the invention shown, such flow is obtained by arranging the inlet passage and inlet valve such that the flow of air entering the chamber has vertical and horizontal velocity components relative to the chamber 27.

In furtherance to this end, the inlet valve 53 is mounted in a bushing 57 fitted in an opening, or passage, 58 in the head 30. The air inlet passage 59, formed in the head 30, has a longitudinal axis which is inclined at an angle of approximately 30° to 35° to the transverse plane of the piston chamber 27, and the head 61 of the valve 53 seats on the end of the passage 59 terminating in the piston chamber 27 adjacent the periphery thereof. The inlet passage 59 is further arranged relative to the chamber 27 such that air entering the chamber 27 follows a flow path which is substantially tangential to the cylinder wall, or boundary, of the chamber 27.

This arrangement of the inlet passage 59 and valve 53, aided by the sequence of the valve events, to be discussed in detail hereinafter, and the form of the piston face 29, gives rise to a toroidal flow pattern within the piston chamber 27. More specifically, the flow of air entering the piston chamber 27 at an angle of from 30–35° has a horizontal—relative to the chamber—velocity component tangential to the cylinder walls and a vertical velocity component. The horizontal tangential component results in circular flow in the horizontal plane whereas the longitudinal component results in circular movement of air in the longitudinal, or vertical, plane of the cylinder. The air moving downwardly in the chamber 27 strikes the face of the piston and is reflected, aided by the concave shape of the face 29, back along a path following the central portion of the longitudinal axis of the chamber 27.

Under normal operating conditions, with the arrangement described, air enters the chamber 27 at a relatively high velocity—for example 300 to 500 feet per second at 5 p. s. i. pressure in the manifold 18. This high velocity flow, as was previously mentioned, persists until ignition of the fuel-air mixture. Because of such high velocity flow in the piston chamber 27, it was found that if the ignitor or spark plug 62 was mounted in the conventional manner—that is, with the electrodes of the plug flush with the boundary of or extending into the piston chamber—highly unsatisfactory performance of the engine at all load levels resulted. To overcome this difficulty, means are provided to protect the plug 62 from direct contact with such high velocity flow. This protection is here obtained by mounting the plug 62 in a spark plug recess 63 formed in the head 30 (see Fig. 6) and located adjacent the periphery of the chamber 27. The plug is mounted in such manner that the spark plug electrodes 64 are retracted from the piston chamber into the recess 63 approximately three-eighths to five-eighths of an inch. In other words, the electrodes 64 are housed within a recess and located one-half inch from the boundary of the chamber 27. It is also to be noted that the plug 62 is mounted in the side of the head 30 and the electrodes 64 are located adjacent the peripery of the chamber 27. With this arrangement effective ignition of the fuel-air mixture within the chamber 27 resulted over the entire load range of the engine.

With the afore-described combination of inlet passage location, high velocity air and fuel injection, and a protected spark, the following valve events are illustrative.

| Crank Angle | Stroke | Event |
| --- | --- | --- |
| 20° btdc | Compression | Ignition. |
| 45° bbdc | Power | Exhaust Valve Opens. |
| 75° btdc | Exhaust | Inlet Valve Opens. |
| 60° atdc | Suction | Exhaust Valve Closes. |
| Approx. bdc | do | Fuel Injection Starts. |
| 30° abdc | Compression | Inlet Valve Closes. |
| 50° abdc | do | Injection Stops. | btdc=before top dead center.
bbdc=before bottom dead center.
atdc=after top dead center.
abdc=after bottom dead center.
bdc=bottom dead center.

Assuming an air pressure in the manifold 18 of five pounds per square inch (p. s. i.), a gas pressure of 30 p. s. i. in the manifold 13 and that the engine is operated at normal speed, the operation of the engine is as follows.

The gas, exhaust and inlet valves 36, 52 and 63, respectively, are closed at the beginning of the power stroke. At a crank angle of 45 degrees before bottom dead center, the exhaust valve 52 is actuated into the open position by the rocker 50 and the exhaust period starts. At 75 degrees before top dead center on the exhaust stroke, the inlet valve 53 is actuated into its open position by the rocker 51 and air is injected or drawn into the combustion chamber 27 at a high velocity and, because of this high velocity and the directed flow, the exhaust gases still remaining in the combustion chamber at the time the inlet valve is opened are quickly forced into the exhaust passage 56. The air serves, then, not only to support combustion, but to cleanse the combustion chamber of burned gas and cool the cylinder so that the engine runs at a relatively low temperature.

Sixty degrees after top dead center on the suction stroke the exhaust valve closes and thereafter all air admitted into the combustion chamber is retained therein to support combustion. This entire mass of air moves at high velocity along a toroidal flow path, and it is into this toroidal flow that fuel is injected at approximately bottom dead center on the suction stroke. Because of the high velocity of the tubular jet of fuel, great depth of penetration is obtained, and it is permissible to start fuel injection when the piston is near bottom dead center thereby insuring thorough mixing of the fuel and air prior to ignition. Thirty degrees after bottom dead center on the compression stroke, the inlet valve closes. It is to be noted that although fuel injection starts before the inlet valve is closed, this does not displace any air from the cylinder due to the inertia effect on the air flowing at high velocity into the cylinder.

At, say 20 degrees before top dead center, the spark plug 62 is fired igniting the small volume of the relatively quiescent fuel-air mixture which expands and is then swept into the toroid. Due to such toroidal flow, the speed of flame propagation is greatly increased, thereby increasing the efficiency of the engine for the reason previously discussed. This increase in flame propagation is attributed, in part, to the fact that there is two directional flow in the combustion chamber thereby causing rapid disbursement of the flame front over a greater area than occurs in absence of such flow.

It is to be noted that inasmuch as the spark plug 62 is located in the recess 63 in such manner that the electrodes 64 are protected from the direct blast of the high velocity air in the combustion chamber, that ignition of the fuel-air mixture throughout the entire load range of the engine is assured.

An engine constructed in accordance with the practice of this invention was found to operate over a wider load range than heretofore possible. For example, the engine operated without missing down to about 55% stoichiometric fuel-air ratio, and best efficiency occurred around 55% to 67% ratio or 80% to 50% excess air. This illustrates that such an engine is capable of operating on an extremely lean mixture and has a relatively large overload capacity.

While I have shown and described a specific form of my invention, it is to be understood that various changes and modifications may be made without departing from the spirit of the invention as set forth in the appended claims.

I claim:

1. A four stroke cycle internal-combustion gas engine comprising a cylinder having a piston chamber, a reciprocating piston therein, an air inlet for supplying air under pressure to said chamber, valve means for controlling the pressure of such air, an air inlet valve in said air inlet for controlling the flow of air therethrough, said air inlet and air inlet valve being so constructed and so arranged as to direct the flow of air at high velocity into the chamber substantially tangential to the wall of the chamber and such flow having vertical and horizontal velocity components relative to the said chamber, a fuel valve for admitting gas into said chamber being arranged to form a high velocity jet of gas and being timed to admit such gas when the piston is near bottom center prior to ignition, an ignitor for the fuel and air mixture in the chamber, an exhaust outlet for the escape of exhaust from the chamber, an exhaust valve therein, a valve actuator for actuating the said air inlet and exhaust valves and arranged to hold the inlet valve open during at least a portion of the period that said exhaust valve is in the open position, and means for protecting the ignitor from direct contact with the high velocity flow of air and fuel in the chamber.

2. An internal-combustion engine having a plurality of cylinders, each cylinder having a piston chamber and a reciprocating piston therein, an air manifold, branch pipes leading from the manifold to each cylinder for supplying air under pressure to the chambers, a valve in each of said branch pipes for controlling the pressure of air supplied the chambers, air inlet valves for each cylinder for controlling the flow of air into the chambers, exhaust valves for controlling the flow of exhaust from said chambers, fuel valves for admitting fuel into said chambers, ignitors for each cylinder for igniting the fuel, and valve actuators for actuating said inlet and exhaust valves and arranged to hold the exhaust valves open during at least a portion of the period during which the inlet valves are open.

3. An internal-combustion engine having a plurality of cylinders, each cylinder having a recess and a piston chamber therein, a reciprocating piston in each chamber, an air manifold, branch pipes leading from the manifold to each cylinder for supplying air under pressure to the chambers, a pump for supplying air under pressure to said manifold, a valve in each of said branch pipes for controlling the pressure of air supplied to the chambers, air inlet valves for each cylinder for controlling the flow of air into the chambers, said inlets and inlet valves being arranged to create high velocity toroidal air flow in the chambers, exhaust valves for controlling the flow of exhaust from said chambers, fuel valves for admitting fuel into said chambers, ignitors positioned within said recesses in such manner as to protect said ignitor from direct contact with the high velocity flow in the chambers, and valve actuators for actuating said inlet and exhaust valves and arranged to hold the exhaust valves open during at least a portion of the period during which the inlet valves are open.

4. A four stroke cycle internal combustion gas engine having a cylinder with a piston chamber therein, a piston reciprocably mounted in the chamber, inlet and exhaust passages leading from the chamber for the admission of air into and escape of exhaust from the chamber, inlet and exhaust valves for said passages, means for supplying compressed air to said inlet, valve means for controlling the pressure of such compressed air, said inlet passage being arranged to direct a high velocity flow of air along the circumference of the chamber and along a path inclined with respect to the longitudinal axis of the chamber to create a high velocity toroidal flow in the chamber during the fuel injection and combustion period of the engine cycle, a fuel port opening into the chamber near the top thereof, a valve for the fuel port, said fuel valve being timed to open when the piston is near the bottom of the chamber prior to ignition, means for supplying a gaseous fuel to the fuel port at an increased pressure, the fuel port and fuel valve being arranged to direct a high velocity jet of gas toward the bottom of the chamber, an igniter, and means for protecting the igniter from the high velocity toroidal flow in the chamber.

5. A four-stroke cycle internal combustion gas engine having a cylinder with a piston chamber therein, a piston reciprocably mounted in the chamber, inlet and exhaust passages from the chamber for the admission of the air into and escape of exhaust from the chamber, inlet and exhaust valves for said passages, means for supplying compressed air to said inlet, valve means for controlling the pressure of such air, said inlet passage being arranged to direct a high velocity flow of air along the circumference of the chamber and along a path having a velocity component directed downwardly in the chamber toward the face of the piston to create a high velocity toroidal flow in the chamber, the inlet valve being timed to open prior to the closing of the exhaust valve so as to cause such toroidal flow to exist in the chamber during the exhaust stroke and throughout the compression stroke and during the combustion period of the engine cycle, a fuel port opening into the chamber, a valve for the fuel port, said fuel valve being timed to open when the piston is near the bottom of the chamber, means for supplying a gaseous fuel to the fuel port at an increased pressure, the fuel port and fuel valve being arranged to direct a high velocity jet of fuel having a flow-path substantially parallel to the longitudinal axis of the chamber and lying wholly within the chamber, an igniter, and means for protecting the igniter from the high velocity toroidal flow in the chamber.

6. A four-stroke cycle internal combustion gas engine having a cylinder with a piston chamber therein and cylinder head closing the top of the piston chamber, a piston reciprocally mounted in the chamber and having a concave face, inlet and exhaust passages in the head leading from the chamber for the admission of air into and the escape of exhaust from the chamber, inlet and exhaust valves for said passages, means for supplying compressed air to said inlet, valve means for controlling the pressure of such air, said inlet passage being arranged to direct a high velocity jet of air along the circumference of the chamber and along a path inclined with respect to the longitudinal axis of the chamber against the face of the piston to create a high velocity toroidal flow in the chamber, the inlet valve being timed to open prior to the closing of the exhaust valve so as to cause such toroidal flow to exist in the chamber during the exhaust stroke and throughout the compression stroke and during the fuel admission and combustion period of the engine cycle, a fuel port in said head opening into the chamber, a valve for the fuel port, said fuel valve being timed to open when the piston is near the bottom of the chamber, means for supplying a gaseous fuel under pressure to the fuel port, the fuel port and fuel valve being arranged to direct a high velocity tubular jet of fuel along a flow-path having an axis substantially parallel to the longitudinal axis of the chamber, an igniter positioned in said head and having points communicating with the interior of the chamber, and means for protecting the igniter points from direct force of the high velocity flow in the chamber.

References Cited in the file of this patent

UNITED STATES PATENTS

| | | |
|---|---|---|
| 1,461,089 | Hall | July 10, 1923 |
| 1,733,975 | Osterhout | Oct. 29, 1929 |
| 1,759,187 | Davidson | May 20, 1930 |
| 2,028,760 | Dillstrom | Jan. 28, 1936 |
| 2,046,264 | Hesselman et al. | June 30, 1936 |
| 2,117,380 | Walters | May 17, 1938 |
| 2,125,293 | Hesselman | Aug. 2, 1938 |
| 2,280,839 | Nallinger | Apr. 28, 1942 |
| 2,283,370 | Jedrzykowski | May 19, 1942 |
| 2,306,950 | Jacoby et al. | Dec. 29, 1942 |
| 2,457,652 | Fisher | Dec. 28, 1948 |
| 2,470,747 | Shepherd | May 17, 1949 |
| 2,477,712 | Anderson | Aug. 2, 1949 |
| 2,593,769 | Kollsman | Apr. 22, 1952 |
| 2,654,355 | Scheiterlein | Oct. 6, 1953 |

FOREIGN PATENTS

| | | |
|---|---|---|
| 310,435 | Great Britain | Apr. 26, 1929 |
| 466,677 | Great Britain | June 2, 1937 |
| 639,634 | Great Britain | July 5, 1950 |

OTHER REFERENCES

Publication: "Internal Combustion Engines," 5th edition, 1939, by Lichty, page 324.